United States Patent

[11] 3,542,321

| [72] | Inventor | Richard D. Kahabka |
| | | Burnsville, Minnesota |
| [21] | Appl. No. | 733,749 |
| [22] | Filed | May 29, 1968 |
| [45] | Patented | Nov. 24, 1970 |
| [73] | Assignee | Minnesota Mining and Manufacturing Company |
| | | Saint Paul, Minnesota |
| | | a corporation of Delaware |

[54] TIE
12 Claims, 11 Drawing Figs.

[52] U.S. Cl. ................................................. 248/68,
24/16, 248/74, 248/205
[51] Int. Cl. ............................................ F16l 3/14,
F16l 3/22
[50] Field of Search .......................................... 248/74PB,
74, 68; 24/16PB, 20R

[56] References Cited
UNITED STATES PATENTS

| 3,074,677 | 1/1963 | Eckhardt | 248/74 |
| 3,149,808 | 9/1964 | Weckesser | 24/16X |
| 3,302,913 | 2/1967 | Collyer | 248/73 |
| 3,362,412 | 1/1968 | Moller | 24/16 |

FOREIGN PATENTS

| 1,005,269 | 9/1963 | Great Britain | 24/16 |

Primary Examiner—Chancellor E. Harris
Attorney—Kinney, Alexander, Sell, Steldt and Delahunt ABSTRACT: A tie for retaining and supporting a bundle of wires includes a flexible serrately toothed strap terminating in a strap-receiving loop fitted with a strap-securing flexible pawl carrying a release member, for insertion into, or unitary with, an adherent mounting plate.

Patented Nov. 24, 1970 3,542,321
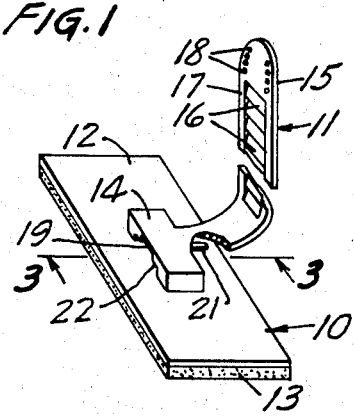
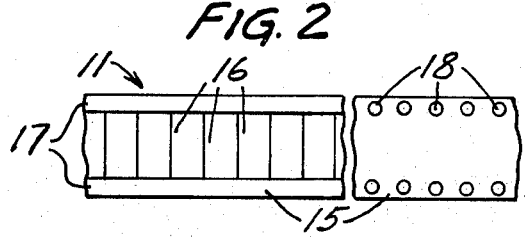
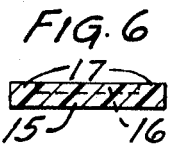
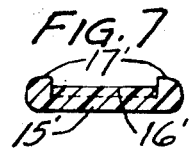
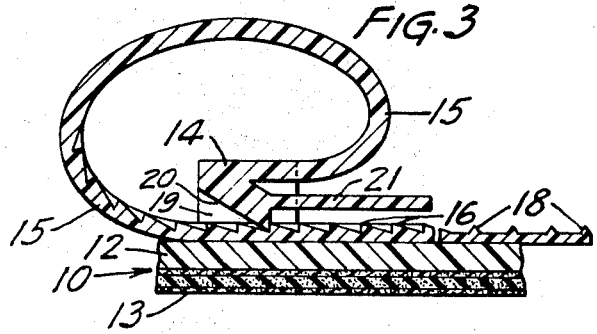
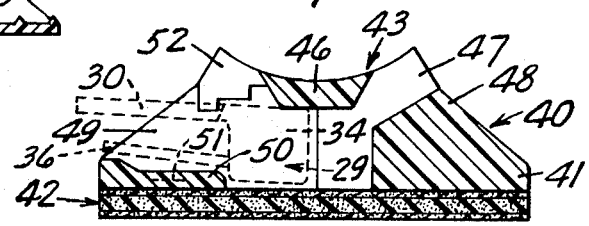
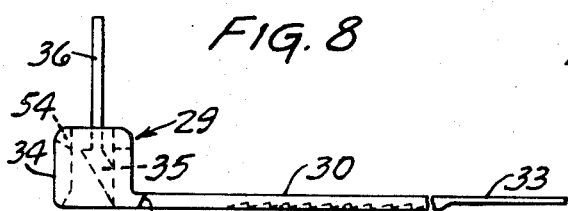
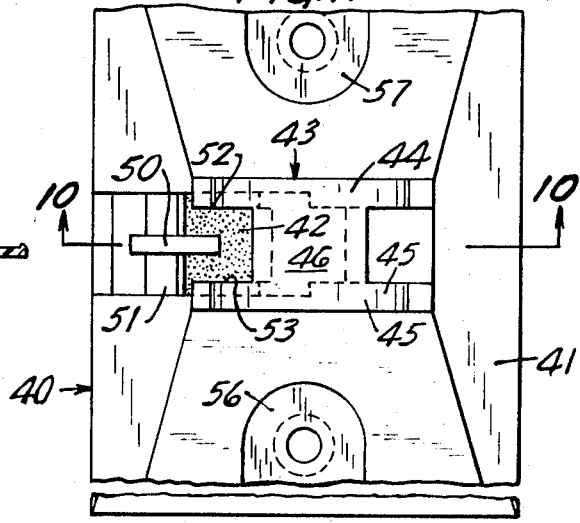
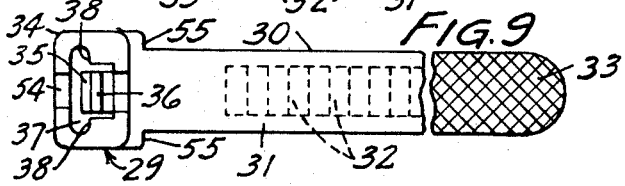
INVENTOR.
RICHARD D. KAHABKA
BY Kinney, Alexander,
Sell, Steldt & DeLa Hunt
ATTORNEYS 3,542,321

1

TIE

SPECIFICATION

This invention relates to the fastening, and assembling under pressure, of bundles of wires or the like and more particularly to tie means useful therein. In one important aspect the invention relates to ratchet type tie members which may be pulled up tightly around an item to be supported, e.g. a wire-bundle, and subsequently released and removed without damage to the ratchet lock members. In another aspect the invention relates to tie members adapted to be applied around wire-bundles and adhered to walls or other supporting surfaces by simple hand application. A further aspect of the invention involves structure which permits removal and replacement of the same or a different tie element using the same adherently attached mounting or base member.

IN THE DRAWING

FIG. 1 is a view in perspective partly cut away to show detail, showing one form of combined tie and adhesive mounting, FIG. 2 is a plan view of portions of the tie member of FIG. 1, FIG. 3 is a partial sectional elevation of the article of FIG. 1 as installed, taken approximately along line 3-3 of FIG. 1, FIG. 4 is a partial front elevation, partly in section, of the article of FIG. 3, FIG. 5 illustrates in sectional elevation an alternate structure similar to that of FIGS. 1 and 3, as applied to a wire-bundle, FIGS. 6 and 7 are partial transverse sectional views of alternate tie members, FIGS. 8 and 9 are partial elevational and plan views respectively of another and presently preferred form of tie member useful as a replacement for the tie portion of FIG. 1, and FIGS. 10 and 11 are sectional elevation and plan views respectively of a further form of mounting adapted particularly for use with the tie member of FIGS. 8 and 9.

The article of FIG. 1 comprises a base or mounting member 10 and a tie member 11 unitary therewith. The base comprises a flat-surfaced plate 12 covered on the outer flat surface with a pressure-sensitive adhesive layer 13. Centrally disposed on the opposite surface is a bridgelike projection 14 greatly extended at one side to form an elongate flexible strap 15, the plate, projection, and projection being formed in one piece from tough, resiliently deformable polymeric material. As shown in the drawing, the strap 15 has a series of central transverse ridges 16, having a serrate longitudinal cross section between edge rails or guides 17 along a major portion of its upper face, and a number of projections 18 along the terminal portion, the latter details being also illustrated in FIG. 2.

A central opening 19 between the plate 12 and the projection 14 permits insertion of the free end of the strap 15, as shown in FIG. 3. A pawl 20 suspended beneath and from the longitudinal center of the projection 14 is deflected upwardly by passage of the ridges 16 during entry of the strap, and normally effectively prevents withdrawal of the strap. A tonguelike lever 21 extending from the free end of the pawl provides means for raising the latter sufficiently to clear the ridges 16 when withdrawal of the strap is desired. 16' of FIG. 4 illustrates the position of the rails 17 of the strap 15 as they slide along shoulders 22 formed across the interior of the bridgelike projection 14. The strap 15 is thereby held in position below the free end of the pawl 20 when the latter is raised by pulling on the lever 21 during withdrawal of the strap. The rails also aid in preventing undue bending and permanent deformation of the pawl during tightening of the strap about the wire-bundle. In the strap 15 as shown in FIG. 6, the rails 17 and the tips of the ridges 16 are coplanar. In the alternative structure shown in FIG. 7 the rails 17' are raised well above the ridges 16' of the strap 15', thereby requiring appropriate modification of the mounting member, for example by lengthening the pawl 20. Various combinations and modifications of these structures may also be used; for example, the strap may have a raised rail at one edge and a lowered rail at the other, or the rail structure and corresponding shoulder structure may be restricted to apply to but one edge of the strap.

The ends of the strap 15 of the embodiment shown in FIG. 3 will be seen to point in opposite directions when the strap is placed around a wire-bundle, the latter therefore being supported generally over the center of the base 10. FIG. 5 illustrates an alternate structure wherein the two ends of the strap 23 as assembled around a wire-bundle both point in the same direction so that the loop, encircling the wires 39, is offset to the side of the projection 24 and the base 12 and does not overhang the lever 27, leaving the latter more readily accessible for release of the strap if desired. In this modification the serrate ridges 26 are formed on the inside rather than the outside surface of the strap 23.

FIGS. 1 and 5 illustrate structures wherein the tie and base are unitary and which serve admirably for new installations, being particularly adapted to the suspending of communications wires or cables. It sometimes becomes desirable to release such wires or cables, e.g. for adding or removing a wire or temporarily moving a cable or wire-bundle. Temporary release may be achieved by pulling on the tonguelike lever 21 or 27 to raise the pawl 20 or 28 out of contact with the ridges 16 or 26 and then withdrawing the strap, which is held out of contact with the raised pawl by the shoulders 22. Permanent release may of course be obtained by merely severing the strap from the projection e.g. with a knife or a pair of cutters, and then pulling it through the annulus and discarding it. For replacing the wire-bundle under such circumstances a separate tie member such as the tie 29 of FIGS. 8 and 9 is particularly useful.

The tie 29 includes an elongate strap portion 30 having side rails 31 and transverse ridges 32 on the inner surface and terminating in a roughened tip or leading end 33, and an annular head or end portion 34 containing a pawl 35 and lever 36. The strap 30 is of a size permitting it to be drawn through the opening 19 between bridge 14 and base 12 of the article of FIG. 1 after the strap 15 has been removed. When so inserted, the strap 30 may be placed around the wire-bundle and formed into a tight loop, the strap slidably fitting within the opening 37 of the annular head 34 and against the shoulders 38 and the pawl 35. The tie may subsequently be removed if desired, the lever 36 being used to release the flexible pawl 35.

The adhesive coating 13 of FIGS. 1 and 3 preferably is a three-layer construction consisting of an inner thin tough compressible foam layer between two high strength thin normally tacky and pressure-sensitive adhesive layers. The adhesive forms a strong bond to the plastic plate 12 and to adhesive-receptive glass, metal, wood or other structural surfaces to which applied. The compressible foam permits permanent full adhesive contact with surfaces having minor roughness or irregularities and assures maximum bonding.

In an illustrative example following the structure shown in FIG. 1, the plate 12 is 0.1 × 1. × 2.0 inches. The bridgelike projection 14 is 0.25 × 0.50 inch and extends to a height of 0.14 inch above the surface of the plate. The strap 15 is .04 × .25 × 4.4 inch, the portion with the projections 18 extending 1 inch from the free end and the portion with the ridges 16 and rails 17 extending an additional three inches. The unitary plate and strap construction is of nylon polyamide plastic. Polypropylene can also be used.

The mounting 40 of FIGS. 10 and 11 is initially constructed to accommodate and be used with the tie 29 of FIGS. 8 and 9, one position of such a tie 34 being indicated in dotted outline in FIG. 10. The mounting includes an elongate base 41 having a flat bottom surface carrying a compressible three-layer pressure-sensitive adhesive stratum 42. The mounting is centrally elevated to form a bridge structure 43 including curved side members 44, 45 and a central connecting member 46. An opening 47 of just sufficient width and thickness to permit easy passage therethrough of the strap 30 of the tie member 29 of FIGS. 8 and 9 is provided between the connecting member 46 and the raised portion 48 of the base at one side of the mounting.

Opposite and interconnected with the opening 47, a larger opening 49 is provided of a size adapted to accept the annular head 34 of a tie member 29. A narrow tongue 50 extends beyond the inner edge of a resiliently flexible thinner portion 51 of the base 41 into the opening 49, and stepped extensions 52, 53 extend from the side members 44, 45 partway into the opening beyond the walls abutting the portion 51. The pressure-sensitive adhesive stratum 42 which, as previously described, desirably includes a thin central compressible layer between two adhesive layers, extends across the centrally perforate area of the base 41.

The tie member 29 is pressed into the opening 49 against the resistance offered by the tongue 50, which is resiliently depressed into the adhesive layer 42, and by the lever 36, which is resiliently displaced from its initial position as shown in FIG. 8 into the position shown in FIG. 10. The tie is thereby held firmly in place with the annular head 34 within the opening 49 and with the strap 30 extending substantially parallel to the flat surface of the base 41. In this condition the assembly is in condition for convenient and space-saving packaging.

When the tie is to be used, it is a simple matter to rotate the head 34 by lifting the strap 30 to a position substantially perpendicular to the flat base, with the strap abutting the edge of the connecting member 46 and the tongue 50 of the base fitting into the centrally depressed front edge 54 of the head. Completion of the rotation is announced by the clicking caused as the extended rear edges 55 of the head 34 snap past the inner stepped corners of the extensions 52, 53. The resiliency of the adhesive layer, particularly when the base has first been adhesively attached to a wall or other supporting surface, aids in maintaining the tie in its final position while the strap is being wrapped about the cable or wire-bundle and inserted through the annular head and beneath the bridge 46.

The base 40 is additionally supplied with depressions 56, 57 having central relieved punch marks permitting the accurate locating of permanent fastening devices such as nails or screws for use on dusty or oily or curved substrates to which pressure-sensitive adhesives might provide an inadequate bond.

The two-piece structure of the tie assembly of FIGS. 8—11 permits the use for the tie and base components of different plastics materials having specifically different properties. As an example, the tie element 29 may be constructed of nylon, having desirably high flexibility, tensile strength, and compressive strength, and in any desired length. The base element 41 may then be made of a terpolymer of acrylonitrile, butadiene and styrene or of flexible plasticized polyvinyl chloride, either of which has fully adequate strength and resiliency for this less demanding purpose and is significantly less expensive than the polyamide material.

I claim:

1. A cable tie comprising an elongate flexible flat strap terminating at one end in an annular holding member having an interior flat surface and at least one shoulder opposing said flat surface, and a resilient pawl extending from alongside said shoulder toward said flat surface in a direction and for a distance to provide one-way ratchet engagement with said strap and capable of being deflected beneath the level of said shoulder, said strap having along one face at least one edge rail for cooperation with said one shoulder for slidably holding the other face of said strap against said flat surface, and having alongside said rail a series of lateral serrate ridges for cooperation with said pawl in providing said ratchet engagement on drawing the free end of said strap into and through said annular member.

2. The cable tie of claim 1 wherein said strap includes an edge rail along each longitudinal edge of said one face and said holding member has a shoulder at each side of said pawl.

3. The cable tie of claim 2 wherein said ridges lie on the same side of said strap as said pawl.

4. The cable tie of claim 2 wherein said ridges lie on the side of said strap opposite said pawl.

5. The cable tie of claim 1 including a pawl-retracting lever extending from near the free end of said pawl for drawing said pawl out of strap-engaging position.

6. The cable tie of claim 1 including a base member (12) integral with and extending from said annular member and having an outer flat surface for attachment to a support.

7. The cable tie of claim 6 wherein said flat surface carries a resiliently compressible pressure-sensitive adhesive layer.

8. The cable tie of claim 7 wherein said strap includes an edge rail along each longitudinal edge of said one face and said holding member has a shoulder at each side of said pawl, and wherein is included a pawl-retracting lever extending from near the free end of said pawl for drawing said pawl out of strap-engaging position.

9. The cable tie of claim 1 wherein said strap includes an edge rail along each longitudinal edge of said one face and said holding member has a shoulder at each side of said pawl, and wherein is included a pawl-retracting lever extending from near the free end of said pawl for drawing said pawl out of strap-engaging position.

10. The cable tie of claim 9 wherein said annular holding member (34) has a centrally depressed front edge (50) and extended rear edges (55).

11. In combination, the cable tie of claim 10 and a base member (41) having a flat centrally perforate base, a central bridge structure extending over the area of perforation and comprising inwardly extending stepped side walls (52, 53) and a central outer connecting member (46), and, at the front of said area of perforation, a central tongue (50) extending into the bridged area and supported on a resiliently flexible thin segment (51) of said base, and a compressible pressure-sensitive adhesive layer underlying said base, said stepped side walls, connecting member, and flexible segment defining a recess for retaining said annular holding member (34) with said central tongue (50) fitting against said centrally depressed front edge (54) and said extended rear edges (55) fitting against said stepped side walls (52, 53).

12. A base member (41) adapted for receiving the cable tie of claim 10 and comprising a flat centrally perforate base, a central bridge structure extending over the area of perforation and including inwardly extending stepped side walls and a central outer connecting member, and, at the front of said area of perforation, a central tongue (50) extending into the bridged area and supported on a resiliently flexible thin segment (51) of said base, said bridge structure defining a front recess for retaining the annular head (34) of a cable tie (29) with the central tongue (50) fitting against the centrally depressed front edge (54) of said head and with the extended rear edges (55) of said head fitting against the stepped side walls (52, 53) of said bridge structure, and said bridge structure further defining a rearward passage for the elongate ridged strap (30) of said cable tie.

UNITED STATES PATENT OFFICE
CERTIFICATE OF CORRECTION

Patent No. 3,542,321  Dated November 24, 1970

Inventor(s) Richard D. Kahabka

It is certified that error appears in the above-identified patent and that said Letters Patent are hereby corrected as shown below:

Column 1, line 46, "projection" (second occurrence) should read -- strap -- .

Column 1, line 61, delete "16' of".

Signed and sealed this 20th day of April 1971.

(SEAL)
Attest:

EDWARD M. FLETCHER, JR.
Attesting Officer

WILLIAM E. SCHUYLER, J
Commissioner of Patent